(12) United States Patent
Okawa et al.

(10) Patent No.: US 12,137,668 B2
(45) Date of Patent: Nov. 12, 2024

(54) PET ABSORBENT SHEET

(71) Applicant: UNICHARM CORPORATION, Ehime (JP)

(72) Inventors: Ayano Okawa, Kanonji (JP); Yasuhiro Sasano, Kanonji (JP)

(73) Assignee: Unicharm Corporation, Ehime (JP)

( * ) Notice: Subject to any disclaimer, the term of this patent is extended or adjusted under 35 U.S.C. 154(b) by 762 days.

(21) Appl. No.: 17/180,084

(22) Filed: Feb. 19, 2021

(65) Prior Publication Data

US 2021/0169038 A1   Jun. 10, 2021

Related U.S. Application Data

(63) Continuation of application No. PCT/JP2019/032043, filed on Aug. 15, 2019.

(30) Foreign Application Priority Data

Aug. 20, 2018 (JP) .............................. 2018-003202 U
Aug. 20, 2018 (JP) ................................. 2018-154252
Aug. 20, 2018 (JP) ................................. 2018-154254

(51) Int. Cl.
   *A01K 1/015*  (2006.01)
   *B32B 3/04*  (2006.01)

(52) U.S. Cl.
   CPC .............. *A01K 1/0157* (2013.01); *B32B 3/04* (2013.01); *B32B 2307/4023* (2013.01); *B32B 2307/726* (2013.01); *B32B 2451/00* (2013.01)

(58) Field of Classification Search
   CPC ................... A01K 1/0157; B32B 3/04; B32B 2307/4023; B32B 2307/726; B32B 2451/00
   See application file for complete search history.

(56) References Cited

U.S. PATENT DOCUMENTS 6,307,119 B1 * 10/2001 Cammarota ............ A61F 13/42
                                                          604/385.01
2015/0334985 A1   11/2015 Takahashi et al.
(Continued)

FOREIGN PATENT DOCUMENTS

| CN | 108135146 A | 6/2018 |
| EP | 2856864 A1 | 4/2015 |

(Continued)

OTHER PUBLICATIONS

Translation of KR 20090046623 A (Year: 2009).*
(Continued)

*Primary Examiner* — Timothy D Collins
*Assistant Examiner* — Brittany A Lowery
(74) *Attorney, Agent, or Firm* — Osha Bergman Watanabe & Burton LLP

(57) ABSTRACT

A pet absorbent sheet having a thickness direction, a first direction orthogonal to the thickness direction, and a second direction orthogonal to the thickness direction and the first direction includes: a top-surface sheet disposed on a top-surface side; a back-surface sheet disposed on a back-surface side; an absorbent body disposed between the top-surface sheet and the back-surface sheet; and colored portions disposed on a back-surface side of the top-surface sheet and that are visible from a top-surface side of the top-surface sheet. A region that overlaps the absorbent body includes: colored regions where the colored portions are disposed; and a non-colored region where the colored portions are not disposed between the colored regions in the first direction. The non-colored region is disposed throughout an entire region of the absorbent body in the second direction.

10 Claims, 8 Drawing Sheets

(56) References Cited

U.S. PATENT DOCUMENTS

2017/0013799 A1     1/2017    Bolton
2018/0338468 A1*   11/2018   Takahashi ............ A01K 1/0157

FOREIGN PATENT DOCUMENTS

| | | |
|---|---|---|
| JP | H11-018603 A | 1/1999 |
| JP | 2012-029625 A | 2/2012 |
| JP | 2013-247922 A | 12/2013 |
| JP | 2014-068591 A | 4/2014 |
| JP | 2016-103990 A | 6/2016 |
| JP | 2017-093320 A | 6/2017 |
| KR | 10-2009-0046623 A | 5/2009 |

OTHER PUBLICATIONS

Notice of Reasons for Refusal issued in corresponding Japanese Patent Application No. 2018-154254 mailed Aug. 31, 2021 (6 pages).
Notice of Reasons for Refusal issued in corresponding Japanese Patent Application No. 2018-154252 mailed Aug. 31, 2021 (6 pages).
Office Action issued in corresponding Chinese Patent Application No. 201980054664.7, mailed on Jan. 25, 2022 (17 pages).
Extended European Search Report issued in corresponding European Application No. 19852842.4, mailed on Feb. 21, 2022 (9 pages).
Office Action issued in corresponding Chinese Patent Application No. 201980054664.7, mailed on May 11, 2022 (16 pages).
International Search Report issued in International Application No. PCT/JP2019/032043, mailed on Nov. 19, 2019 (9 pages).
Written Opinion issued in International Application No. PCT/JP2019/032043, mailed on Nov. 19, 2019 (5 pages).
English translation of Decision of Refusal issued in corresponding Chinese Patent Application No. 201980054664.7 dated Aug. 31, 2022 (14 pages).

* cited by examiner

PET ABSORBENT SHEET

CROSS-REFERENCE TO RELATED APPLICATIONS

This application is based on and claims priority under 35 U.S.C. § 119 from 2018-154252 filed on Aug. 20, 2018, Japanese Patent Application No. 2018-154254 filed on Aug. 20, 2018, and Japanese Utility Model Registration Application No. 2018-003202 filed on Aug. 20, 2018, the contents of which are incorporated herein by reference.

BACKGROUND

Technical Field

The present invention relates to a pet absorbent sheet that absorbs pet excrement, for example, urine.

Related Art

Pet absorbent sheets that absorb pet excrement, for example, urine are known (refer to Patent Literature 1 and Patent Literature 2 below). A pet absorbent sheet described in Patent Literature 1 has a liquid-impermeable back-surface sheet, a liquid-permeable top-surface sheet, and an absorbent body positioned between the back-surface sheet and the top-surface sheet. A design is provided below the top-surface sheet. The design is disposed in a grid shape throughout the entire absorbent body and is made visible through the top-surface sheet.

A pet absorbent sheet described in Patent Literature 2 has a liquid-impermeable back-surface sheet, a liquid-permeable top-surface sheet, and an absorbent body positioned between the back-surface sheet and the top-surface sheet. A design that is a pH discrimination portion is provided below the top-surface sheet. The design shows a footprint of a pet. The pet absorbent sheet of Patent Literature 1 is capable of enhancing decorativeness with the design showing a footprint of a pet.

PATENT LITERATURE

Patent Literature 1: Japanese Unexamined Patent Publication No. 2012-29625
Patent Literature 2: Japanese Unexamined Patent Publication No. 2014-68591

Typically, in pet absorbent sheets having a design, urine is not easily noticeable, and the urine-covering performance is enhanced compared with pet absorbent sheets having no design. In the pet absorbent sheets of Patent Literature 1 and Patent Literature 2, the urine-covering performance is enhanced throughout the entire absorbent body.

However, some pets discharge urine unevenly only at a certain region rather than discharge urine evenly throughout the entire region of the absorbent body. In some cases, pet absorbent sheets that have been used only partially (only in a certain region) are continuously used with the orientation changed instead of being disposed of. However, when the urine-covering performance is favorable throughout the entire absorbent body as in Patent Literature 1, there is a case where it is difficult for users to differentiate a urine-absorbed region and a non-urine-absorbed region and to identify a time for replacing the sheet.

SUMMARY

One or more embodiments provide a pet absorbent sheet that enables users to easily differentiate a urine-absorbed region and a non-urine-absorbed region and to easily identify a time for replacing the sheet.

A pet absorbent sheet according to one or more embodiments is a pet absorbent sheet having a thickness direction, a first direction orthogonal to the thickness direction, and a second direction orthogonal to the thickness direction and the first direction. The pet absorbent sheet includes a top-surface sheet disposed on a top-surface side; a back-surface sheet disposed on a back-surface side; an absorbent body provided between the top-surface sheet and the back-surface sheet; and colored portions that are disposed on a back-surface side of the top-surface sheet and are visible from a top-surface side of the top-surface sheet. In a region that overlaps the absorbent body, colored regions where a plurality of the colored portions is disposed and a non-colored region where the colored portions are not disposed between the colored regions in the first direction are provided, and the non-colored region is provided throughout an entire region of the absorbent body in the second direction.

A pet absorbent sheet according to one or more embodiments includes: a top-surface sheet disposed on a top-surface side; a back-surface sheet disposed on a back-surface side; an absorbent body provided between the top-surface sheet and the back-surface sheet; and a colored portion that is visible from a top-surface side of the top-surface sheet in a region that overlaps the absorbent body. The colored portion has a first colored portion colored with a first color with a green hue and a second colored portion colored with a second color with a purple hue.

A pet absorbent sheet according to one or more embodiments includes: a top-surface sheet disposed on a top-surface side; a back-surface sheet disposed on a back-surface side; an absorbent body provided between the top-surface sheet and the back-surface sheet; and a colored portion that is disposed on a back-surface side of the top-surface sheet in a region that overlaps the absorbent body and is visible from a top-surface side of the top-surface sheet. The colored portion has a pet face pattern that indicates a face of a target pet that is a target user, the pet face pattern has a first pet face pattern colored with a first color and a second pet face pattern colored with a second color that is different from the first color, and a degree of difference in color between the first color and the second color is by two or more hues in 24 color hues classified by the Ostwald hue circle.

A pet absorbent sheet according to one or more embodiments includes: a top-surface sheet disposed on a top-surface side; a back-surface sheet disposed on a back-surface side; an absorbent body provided between the top-surface sheet and the back-surface sheet; and a colored portion that is disposed on a back-surface side of the top-surface sheet in a region that overlaps the absorbent body and is visible from a top-surface side of the top-surface sheet. The colored portion has a pet face pattern that indicates a face of a cat that is a target user, and has no non-target pattern that indicates a pet other than the target user.

DETAILED DESCRIPTION

Figure 1:
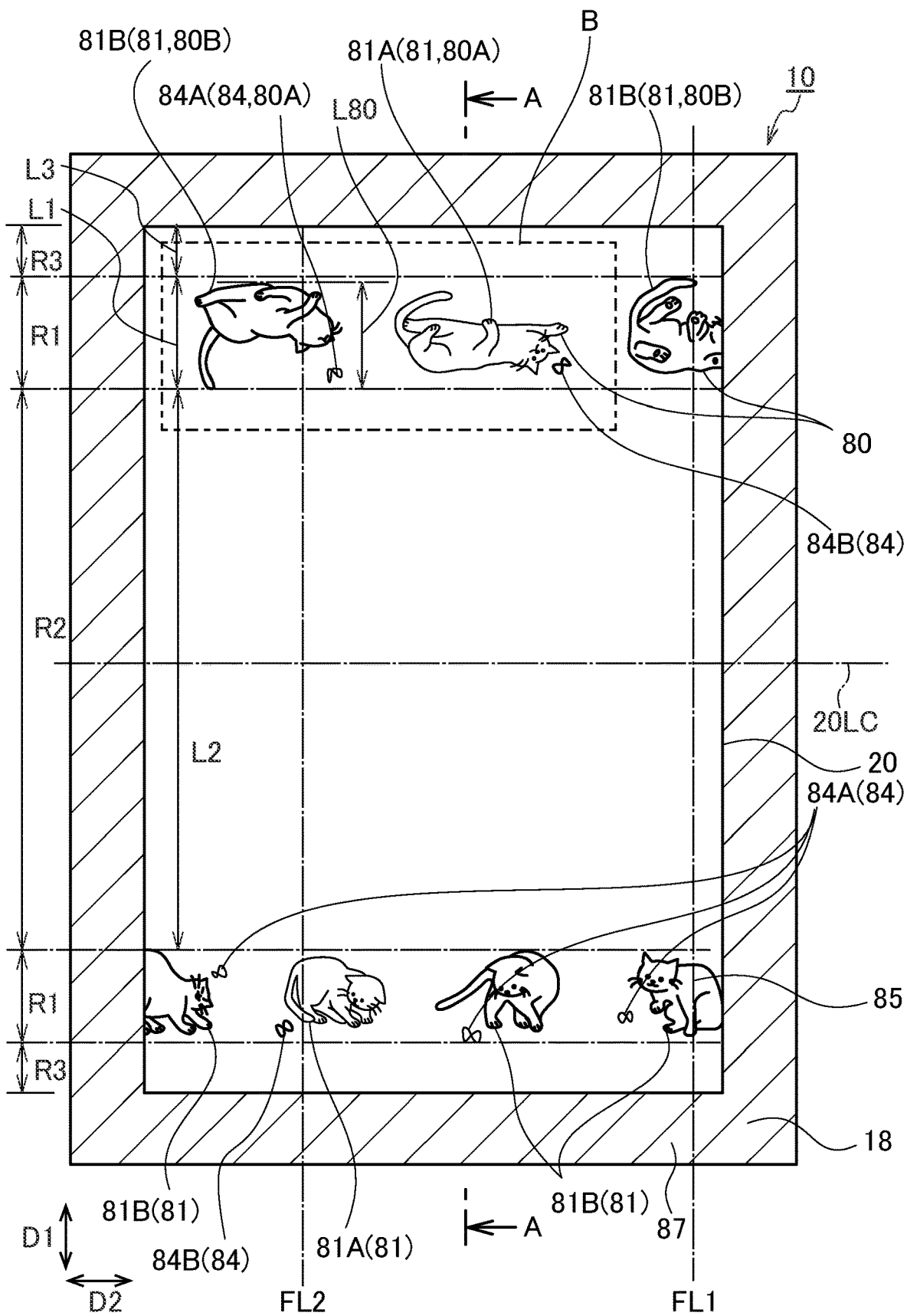
FIG. 1 is a plan view of a pet absorbent sheet according to a first embodiment as seen from an excretion surface side.

Embodiments of the present invention will be described herein with reference to the drawings. Those skilled in the art will recognize that many alternative embodiments can be accomplished using the teaching of the present invention and that the present invention is not limited to the embodiments illustrated herein for explanatory purposes.

According to one or more embodiments, a pet absorbent sheet having a thickness direction, a first direction orthogonal to the thickness direction, and a second direction orthogonal to the thickness direction and the first direction includes: a top-surface sheet disposed on a top-surface side; a back-surface sheet disposed on a back-surface side; an absorbent body provided between the top-surface sheet and the back-surface sheet; and colored portions that are disposed on a back-surface side of the top-surface sheet and are visible from a top-surface side of the top-surface sheet. In a region that overlaps the absorbent body, colored regions where a plurality of the colored portions is disposed and a non-colored region where the colored portions are not disposed between the colored regions in the first direction are provided, and the non-colored region is provided throughout an entire region of the absorbent body in the second direction.

Some pets may discharge urine unevenly only at a certain region (for example, one of the colored regions) rather than discharge urine evenly throughout the entire region of the absorbent body. At this time, in a different region (for example, the other colored region), urine is not discharged or the amount of urine discharged becomes small. During use, urine can be covered with the colored portions in the colored regions. In addition, at the time of replacement, one colored region where a large amount of urine is discharged and the other colored region where a small amount of urine is discharged are visually compared with each other. At this time, the colored regions are provided on both sides of the non-colored region, and one colored region and the other colored region are divided by the non-colored region. Comparison of the colored regions on both sides across the non-colored region facilitates the comparison of the colored regions on both sides. Therefore, users can easily identify whether only one colored region was used and thus the orientation needs to be changed or both colored regions were used and thus the sheet needs to be replaced. In addition, since the non-colored region where the colored portions are not disposed is provided, in the non-colored region, the trace of urine is less likely to be covered with the colored portions. Therefore, users can easily identify whether or not urine was discharged on the pet absorbent sheet.

According to one or more embodiments, the non-colored region may straddle a center of the absorbent body in the first direction. The non-colored region is provided at the center of the absorbent body in the first direction. The non-colored region becomes easily noticeable, and users can easily identify the non-colored region and more easily identify a time for replacing the sheet.

According to one or more embodiments, a length of the non-colored region in the first direction may be longer than a length of the colored portion in the first direction. Since the length of the non-colored region in the first direction is longer than the length of the colored portion in the first direction, it becomes easy to differentiate the gaps between the colored portions and the non-colored region. Therefore, it is easier to obtain an effect of dividing the colored regions on both sides with the non-colored region.

According to one or more embodiments, a length of the non-colored region in the first direction may be longer than a length of each colored region in the first direction Since the length of the non-colored region in the first direction is longer than the lengths of the colored regions in the first direction, it is easier to obtain an effect of differentiating the individual colored regions with the non-colored region.

According to one or more embodiments, in a region that overlaps the absorbent body, a second non-colored region where the colored portions are not disposed may be provided throughout an entire region of the absorbent body in the second direction on an outer side of the colored region in the first direction. On both sides across the colored region, the non-colored region and the second non-colored region are provided. The colored portions in the colored region become more easily noticeable, and the comparison between the colored regions on both sides becomes easier.

According to one or more embodiments, the colored portions may have a first colored portion colored with a first color and a second colored portion colored with a second color that is different from the first color, and an area ratio of the second colored portion to the first colored portion in one of the colored regions may be different from an area ratio of the second colored portion to the first colored portion in the other colored region. Since the area ratio of the second colored portion to the first colored portion differs in one of the colored regions and in the other colored region, users can differentiate one colored region and the other colored region with the difference in the configuration ratio of color, and the comparison between the colored regions on both sides becomes easy.

According to one or more embodiments, the colored portion in one of the colored regions and the colored portion in the other colored region disposed on an any straight line that passes through one of the colored portions and extends along the first direction may differ in terms of at least one of color or shape.

When comparing one of the colored regions and the other colored region, users alternately see one of the colored regions and the other colored region by moving their eyes in the first direction. At this time, since the colored portions adjacent to each other in the first direction are different, users can differentiate one of the colored regions and the other colored region with the difference in color or shape of the colored portions, and the comparison between the colored regions on both sides becomes easy.

A pet absorbent sheet according to one or more embodiments is a pet absorbent sheet comprising: a top-surface sheet disposed on a top-surface side; a back-surface sheet disposed on a back-surface side; an absorbent body provided between the top-surface sheet and the back-surface sheet; and a colored portion that is visible from a top-surface side of the top-surface sheet in a region that overlaps the absorbent body, wherein the colored portion has a first colored portion colored with a first color with a green hue and a second colored portion colored with a second color with a purple hue.

The design of Patent Literature 1 is formed of a colored or chromogenic design. Usually, in pet absorbent sheets having a design, urine is not easily noticeable, and the urine-covering performance is enhanced compared with pet absorbent sheets having no design. However, depending on the color of the design, there has been a concern that the design may be similar to the trace of urine and users may mistakenly recognize an unused pet absorbent sheet as a used pet absorbent sheet. In addition, depending on the color of the design, there has been a concern that urine and the design may be wrongly recognized and it may be impossible to enhance the urine-covering performance with the design. Therefore, one or more embodiments provide a pet absorbent sheet enabling the distinctive recognition of urine and a colored portion and the enhancement of the urine-covering performance with the colored portion.

The pet absorbent sheet according to one or more embodiments is configured to enable the distinctive recognition of urine and the colored portion and the enhancement of the urine-covering performance with the colored portion. Usually, the color of healthy urine has a yellow hue, and the color of unhealthy urine has a red hue. Both the first colored portion with a green hue and the second colored portion with a purple hue are easily recognized distinctively with respect to yellow hues and red hues. Therefore, it is possible for users not to recognizing the colored portion as the trace of urine mistakenly in a pre-use state of the pet absorbent sheet. In addition, users easily recognize both the color of healthy urine and the color of unhealthy urine and easily identify the healthy state and the unhealthy state. Additionally, since urine and the colored portion are easily recognized distinctively, the trace of urine is camouflaged by the colored portion, and it is possible to enhance the urine-covering performance.

According to one or more embodiments, the first colored portion may be a color having an R value of 0 to 128, a G value of 165 to 191, and a B value of 90 to 113 that are based on an RGB color system. All of the R value, the G value, and the B value of the first colored portion are not identical to the values of the color of urine in a healthy state and the color of urine in an unhealthy state, and the first colored portion is easily differentiated from urine.

According to one or more embodiments, the second colored portion may be a color having an R value of 127 to 186, a G value of 65 to 91, and a B value of 136 to 151 that are based on an RGB color system. Both the R value and the B value of the second colored portion are not identical to the values of the color of urine in a healthy state and the color of urine in an unhealthy state, and the second colored portion is easily differentiated from urine.

According to one or more embodiments, the colored portion may be disposed along the contour of a design, and a non-colored portion may be provided in a region surrounded by the colored portion. In a case where urine is discharged on the non-colored portion, it is possible to compare urine and the colored portion. In addition, since the colored portion is disposed to surround the non-colored portion, it is possible to identify the spread condition of urine with the colored portion. Therefore, it is also possible to identify the health states of pets by identifying the amount of urine.

According to one or more embodiments, the first colored portion may have a first pet pattern that indicates a pet pattern marking a pet that is a target user and a first auxiliary pattern that indicates a thing other than pets, the second colored portion may have a second pet pattern that indicates a pet pattern marking a pet that is a target user and a second auxiliary pattern that indicates a thing other than pets, in a region that overlaps the first pet pattern or a vicinity thereof, the second auxiliary pattern may be disposed, and, in a region that overlaps the second pet pattern or a vicinity thereof, the first auxiliary pattern may be disposed. Since the first pet pattern and the second auxiliary pattern are disposed close to each other, and the second pet pattern and the first auxiliary pattern are disposed close to each other, it is possible to compare urine with both the first colored portion and the second colored portion. Therefore, a healthy state and an unhealthy state are easily identified. In addition, users can identify the pet that is the target user by seeing the first pet pattern and the second pet pattern. Therefore, even in a case where there is a plurality of kinds of pets, it is easy to identify the pets that are the targets and to identify the health states of the pets that become the targets. Additionally, since the pet pattern and the auxiliary pattern are integrally provided, the designability is enhanced, and it is possible to further enhance the urine-covering effect.

According to one or more embodiments, a maximum dimension of the first pet pattern may be larger than a maximum dimension of the second auxiliary pattern, and a maximum dimension of the second pet pattern may be larger than a maximum dimension of the first auxiliary pattern. The first pet pattern and the second pet pattern are easily noticeable, and users can identify the pet that is the target user. Therefore, even in a case where there is a plurality of kinds of pets, it is easy to identify the pets that are the targets and to identify the health states of the pets that become the targets.

According to one or more embodiments, the pet absorbent sheet may have an outer peripheral colored portion that is visible from the top-surface side of the top-surface sheet in a periphery of the absorbent body, and the outer peripheral colored portion may have the first color or the second color. Since the outer peripheral colored portion has the first color or the second color, it is possible to make the first colored portion or the second colored portion noticeable with the outer peripheral colored portion. Therefore, it is possible to further enhance the urine-covering effect of the colored portions.

A pet absorbent sheet according to one or more embodiments is a pet absorbent sheet comprising: a top-surface sheet disposed on a top-surface side; a back-surface sheet disposed on a back-surface side; an absorbent body provided between the top-surface sheet and the back-surface sheet; and a colored portion that is disposed on a back-surface side of the top-surface sheet in a region that overlaps the absorbent body and is visible from a top-surface side of the top-surface sheet, wherein the colored portion has a pet face pattern that indicates a face of a target pet that is a target user, the pet face pattern has a first pet face pattern colored with a first color and a second pet face pattern colored with a second color that is different from the first color, and a degree of difference in color between the first color and the second color is by two or more hues in 24 color hues classified by the Ostwald hue circle.

Users that own a plurality of kinds of pets use separate pet absorbent sheets for each kind of the pets. Specifically, a cat absorbent sheet and a dog absorbent sheet are selectively used. However, the pet absorbent sheet of Patent Literature 2 indicates the footprint of a pet, and it is difficult for users to discern whether the pet absorbent sheet is a dog absorbent sheet or a cat absorbent sheet. In addition, in a case where the footprint of a cat is indicated on a dog absorbent sheet, there is a concern that users may mistakenly recognize the target user. Therefore, there is a demand for a pet absorbent sheet that makes users easily identify the target user.

The pet absorbent sheet according to one or more embodiments is configured to make users easily identify the target user. With the first pet face pattern and the second pet face pattern, the decorativeness is enhanced, and it is possible to attract users' attention. In addition, since the first pet face pattern and the second pet face pattern are different colors, both patterns are not integrally recognized, and it is possible to make the patterns separately noticeable. Users can easily identify the pet that is the target user by seeing the pet face patterns.

According to one or more embodiments, the colored portion may not have a non-target pattern that indicates a pet other than the target pet. Users can easily identify the pet that is the target user by seeing the pet face pattern. In addition, since there is no non-target pattern, even in a case where there is a plurality of pets that are the target users, it is possible to use the absorbent sheet without mistakenly recognizing the target.

According to one or more embodiments, the colored portion may have the pet face pattern and a non-target pattern that marks a pet other than a target user, and the number of the pet face patterns may be twice or more the number of the non-target patterns. Users can easily identify the pet that is the target user by seeing the pet face pattern. Since the number of the pet face patterns is twice or more the number of the non-target patterns, users easily recognize that the pet face pattern indicates the target, and it is possible to suppress a failure of mistakenly recognizing the target user. Even in a case where there is a plurality of pets that are the target users, it is possible to use the absorbent sheet without mistakenly recognizing the target.

According to one or more embodiments, a maximum dimension of the pet face pattern may be larger than a maximum dimension of the non-target pattern. The pet face pattern is more easily noticeable than the non-target pattern, and users can easily identify the pet that is the target user by seeing the pet face pattern.

According to one or more embodiments, a color of the non-target pattern may be different from a color of the pet face pattern disposed at a position closest to the non-target pattern, and a degree of difference in color may be by two or more hues in the 24 color hues classified by the Ostwald hue circle. Users easily recognize the pet face pattern and the non-target pattern distinctively. Users can easily identify the pet that is the target user by seeing the pet face patterns.

According to one or more embodiments, the pet face pattern may be a pattern that indicates a face of a cat that is a target user. Users can easily identify that a cat is the target user by seeing the pet face pattern.

According to one or more embodiments, the pet absorbent sheet may have a peripheral region disposed in a periphery of the absorbent body, in the peripheral region, an outer peripheral colored portion that is visible from the top-surface side of the top-surface sheet is provided, the outer peripheral colored portion has a color that is similar to the first color, and a degree of similarity in color is in an identical color hue or in a range of difference of only one hue number in the 24 color hues classified by the Ostwald hue circle. The outer peripheral colored portion and the first color pattern are integrated with each other, whereby decorativeness is enhanced, and it is possible to attract users' attention. In addition, the outer peripheral colored portion and the first color pattern are integrated with each other, whereby the second color pattern is likely to become relatively noticeable. Users can easily identify the pet that is the target user by recognizing the first color pattern or the second color pattern.

A pet absorbent sheet according to one or more embodiments is a pet absorbent sheet comprising: a top-surface sheet disposed on a top-surface side; a back-surface sheet disposed on a back-surface side; an absorbent body provided between the top-surface sheet and the back-surface sheet; and a colored portion that is disposed on a back-surface side of the top-surface sheet in a region that overlaps the absorbent body and is visible from a top-surface side of the top-surface sheet, wherein the colored portion has a pet face pattern that indicates a face of a cat that is a target user, and has no non-target pattern that indicates a pet other than the target user.

Users can easily identify that a cat is the target user by seeing the pet face pattern. In addition, since there is no non-target pattern that indicates a pet other than a cat, even in a case where there is a plurality of pets that are the target users, it is possible to use the absorbent sheet without mistakenly recognizing the target.

According to one or more embodiments, the number of the pet face patterns may be 50% or more of the total number of the patterns. Among all of the patterns, the pet face pattern is more easily noticeable, and users can easily identify the pet that is the target user by seeing the pet face pattern.

According to one or more embodiments, the colored portion may have an auxiliary pattern that indicates a thing other than the pet, and the number of the pet face patterns may be equal to or larger than the number of the auxiliary patterns. The pet face pattern is easily noticeable compared with the auxiliary pattern, and users can easily identify the pet that is the target user by seeing the pet face pattern.

According to one or more embodiments, a maximum dimension of the pet face pattern may be larger than a maximum dimension of the auxiliary pattern. The pet face pattern is more easily noticeable than the auxiliary pattern, and users can easily identify the pet that is the target user by seeing the pet face pattern.

According to one or more embodiments, a color of the auxiliary pattern may be different from a color of the pet face pattern disposed at a position closest to the auxiliary pattern, and a degree of difference in color may be by two or more hues in the 24 color hues classified by the Ostwald hue circle. Users easily recognize the pet face pattern and the auxiliary pattern distinctively. Users can easily identify the pet that is the target user by seeing the pet face patterns.

According to one or more embodiments, the pet face pattern may be a pattern that indicates an entire body of the target user including a face. The pet face pattern shows the entire body, whereby users more easily identify the target pet. Users can easily identify the pet that is the target user by seeing the pet face patterns.

According to one or more embodiments, the pet absorbent sheet may have a background portion that is provided in a periphery of the colored portion in the region that overlaps the absorbent body and is visible from the top-surface side of the top-surface sheet, a color of the pet face pattern may be different from a color of the background portion, and a degree of difference in color may be by two or more hues in the 24 color hues classified by the Ostwald hue circle. The pet face pattern becomes noticeable compared with the background portion, and users more easily recognize the pet face pattern. Users can easily identify the pet that is the target user by seeing the pet face patterns.

(2) Configuration of Pet Absorbent Sheet

Hereinafter, a pet absorbent sheet according to a first embodiment will be described with reference to drawings. It should be noted that, in the following description of the drawings, identical or similar portions will be given identical or similar reference signs. Here, the drawings are schematic views, and attention needs to be paid to the fact that the ratios between individual dimensions and the like are different from actual ones. Therefore, specific dimensions and the like need to be determined with reference to the following description. In addition, there may be a portion where the relationships or ratios between dimensions do not match between drawings. In the following descriptions, "pets" broadly include vertebrates and invertebrates and include typical pets such as cats, dogs, rabbits, and hamsters. The pet absorbent sheet according to one or more embodiments may be a cat absorbent sheet.

Figure 2:
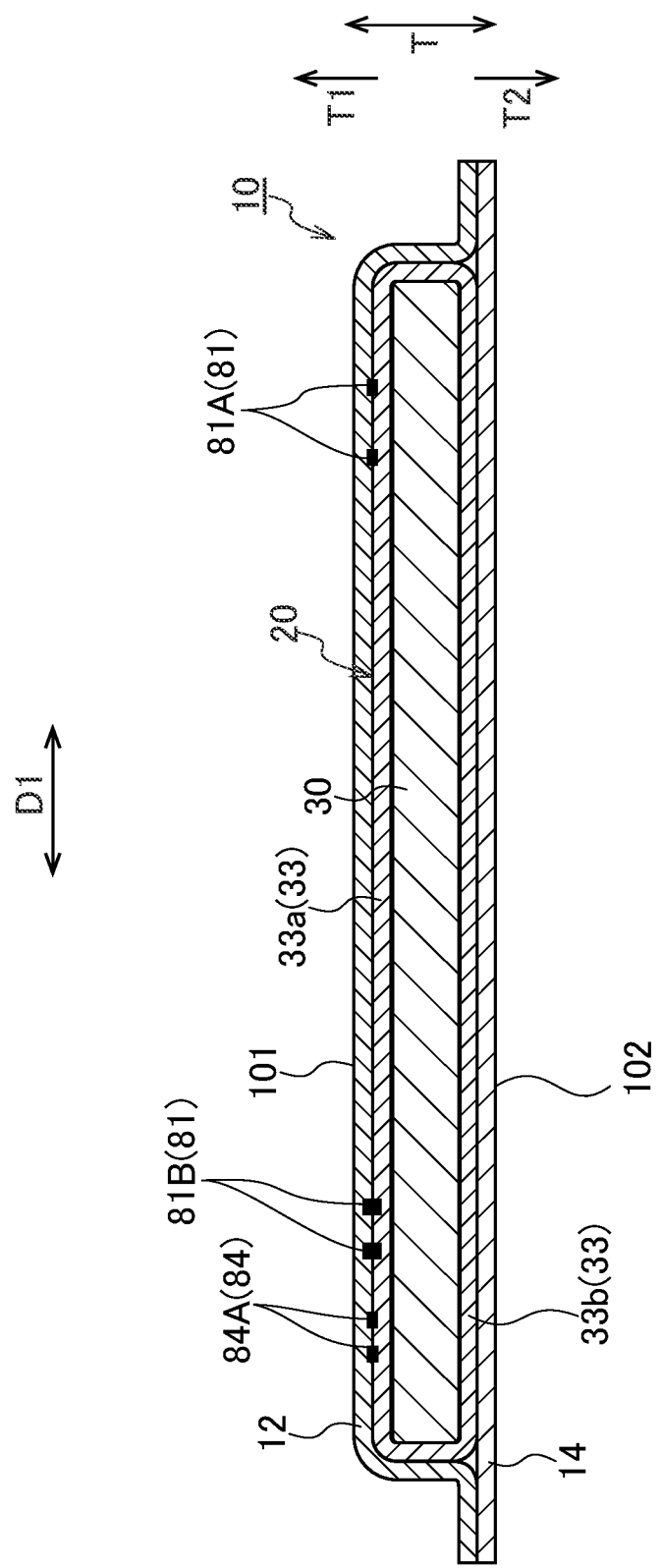
FIG. 2 is a schematic cross-sectional view of the pet absorbent sheet taken along a line A-A shown in FIG. 1.
Figure 3:
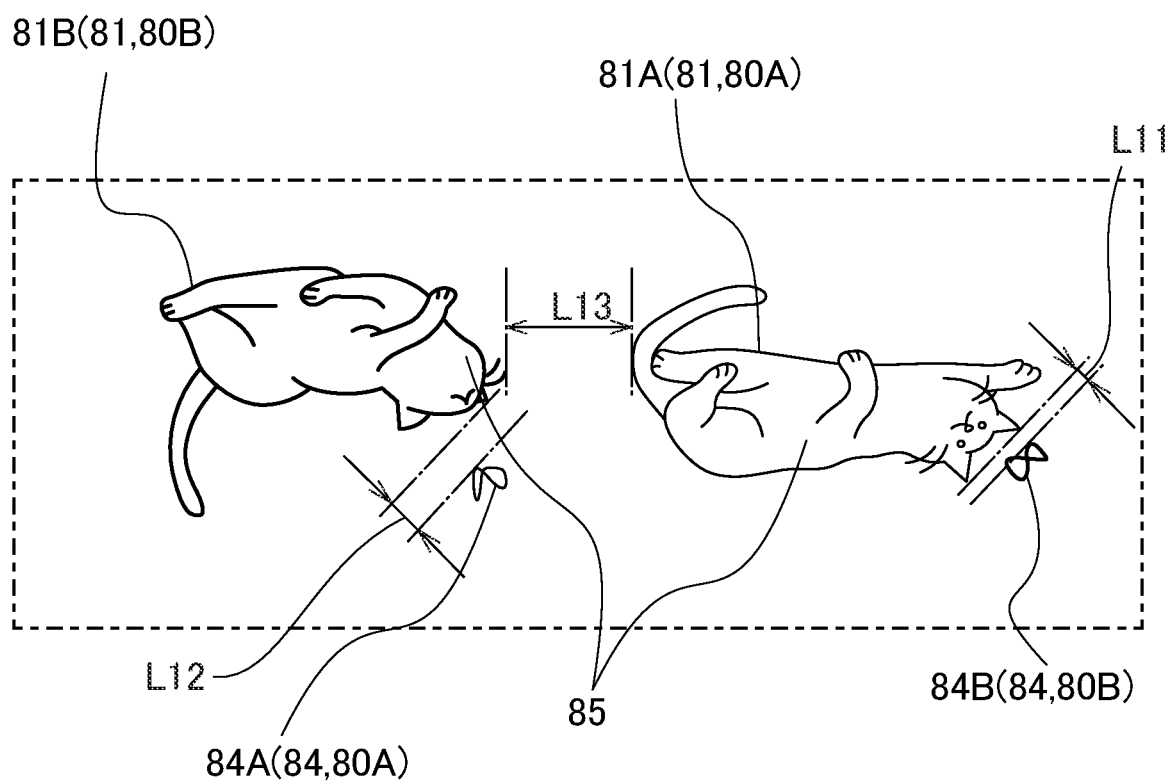
FIG. 3 is an enlarged plan view of part B in FIG. 1.

FIG. 1 is a plan view of a pet absorbent sheet according to a first embodiment as seen from an excretion surface side. FIG. 2 is a schematic cross-sectional view of the pet absorbent sheet taken along a line A-A shown in FIG. 1. FIG. 3 is an enlarged plan view of part B in FIG. 1. The pet absorbent sheet 10 is a flat sheet as a whole. One surface of the pet absorbent sheet 10 is an excretion surface that receives pet excrement. In one or more embodiments, the surface configuring the excretion surface will be described as a top surface 101, and a surface configuring a non-excretion surface will be described as a back surface 102. FIG. 2 shows a top-surface side T1 and a back-surface side T2 in a thickness direction T.

The pet absorbent sheet has a first direction D1 and a second direction D2 that are orthogonal to the thickness direction T. The first direction D1 and the second direction D2 are orthogonal to each other. The first direction D1 and the second direction D2 are directions that extend in the plane direction. The first direction D1 according to one or more embodiments is the longitudinal direction in a plan view, and the second direction D2 is the width direction orthogonal to the longitudinal direction. It should be noted that, in a modified example, the first direction D1 may be the width direction in a plan view, and the second direction D2 may be the longitudinal direction.

The pet absorbent sheet 10 has a top-surface sheet 12 that is disposed on the top-surface side T1, a back-surface sheet 14 that is disposed on the back-surface side T2, and an absorbent body 20. The absorbent body 20 is provided between the top-surface sheet 12 and the back-surface sheet 14. The top-surface sheet 12 may be a liquid-permeable sheet that is permeable to liquid such as pet excrement. The liquid-permeable sheet may be formed of, for example, a liquid-permeable nonwoven fabric or opening film. The back-surface sheet 14 may be a liquid-impermeable sheet that is not permeable to liquid such as pet excrement. The back-surface sheet 14 is not particularly limited and may be formed of, for example, a resin film sheet. In the back-surface sheet 14 according to one or more embodiments, the back-surface sheet 14 is entirely colored. The back-surface sheet 14 may be colored with a first color or second color described below.

A part of the back-surface sheet 14 extends toward the outer side more than the absorbent body 20. The back-surface sheet 14 is visible from the top-surface side T1, and a colored portion of the back-surface sheet disposed in an outer peripheral portion 18 of the pet absorbent sheet 10 configures an "outer peripheral colored portion" in one or more embodiments. The outer peripheral colored portion is visible from the top-surface side of the top-surface sheet 12 in the periphery of the absorbent body. Users can see the back-surface sheet 14 positioned in the outer peripheral portion 18 through the top-surface sheet 12.

The absorbent body 20 may include an absorbent core 30 and a core wrap 33 that wraps the absorbent core 30. The core wrap 33 may include a first core wrap 33a that covers the top-surface side T1 of the absorbent core 30 and a second core wrap 33b that covers the back-surface side T2 of the absorbent core 30. The absorbent core 30 is not particularly limited and may include a hydrophilic fiber layer such as pulp, a superabsorbent polymer (SAP), or a combination thereof. The core wrap 33 is not particularly limited and can be formed of, for example, liquid-permeable tissue.

The pet absorbent sheet 10 has colored portions 80 that are visible from the top-surface side T1 of the top-surface sheet 12 in a region that overlaps the absorbent body 20. The colored portions 80 are disposed on the back-surface side T2 of the top-surface sheet 12. The colored portions 80 according to one or more embodiments are printed on the surface of the first core wrap 33a on the top-surface side T1. It should be noted that, in a modified example, the colored portions 80 may be provided on the surface of the top-surface sheet 12 on the back-surface side, may be provided on the surface of the absorbent core 30 on the top-surface side T1, or may be provided on the surface on the top-surface side T1 of a second sheet that is provided between the top-surface sheet 12 and the absorbent body 20.

The colored portions 80 may include pet patterns 81 that mark a pet that is the target user and auxiliary patterns 84 that indicate a thing other than pets. The pet pattern 81 conceptually includes not only a figure that indicates the face of a pet but also a figure that indicates the body of a pet or a figure that indicates a favorite item. The auxiliary pattern 84 is a figure that indicates a thing other than pets and may be an any figure such as a heart figure or a star figure.

The maximum dimension of the pet pattern 81 in the first direction D1 may be larger than the maximum dimension of the auxiliary pattern 84 in the first direction D1. In addition, the maximum dimension of the pet pattern 81 in the second direction D2 may be larger than the maximum dimension of the auxiliary pattern 84 in the second direction D2. The pet patterns 81 are easily noticeable compared with the auxiliary patterns 84, and users can easily identify the pet that is the target user by seeing the pet patterns 81. Due to the pet patterns 81, users easily recognize a cat that is the pet as the target user, and, even in a case where the target user is a plurality of pets, it is possible to suppress a failure of mistakenly recognizing the target user.

The number of the pet patterns 81 may be 50% or more of the total number of the patterns. Among all of the patterns, the pet patterns 81 are more easily noticeable, and users can easily identify the pet that is the target user by seeing the pet patterns 81. In addition, the number of the pet patterns 81 may be equal to or larger than the number of the auxiliary patterns 84. The pet patterns 81 are easily noticeable compared with the auxiliary patterns 84, and users can easily identify the pet that is the target user by seeing the pet patterns.

In the region that overlaps the absorbent body of the pet absorbent sheet 10, colored regions R1 where a plurality of the colored portions 80 are disposed and a non-colored region R2 where no colored portions 80 are disposed between the colored regions R1 in the first direction D1 may be provided. The colored regions R1 and the non-colored region R2 are provided throughout the entire region of the absorbent body 20 in the second direction D2. The non-colored region R2 is a region where any of the colored portions 80 are not provided throughout the entire region of the absorbent body 20 in the second direction D2. The colored region R1 is a region where some of the colored portions 80 are provided on an any virtual line that extends in the second direction D2 of the absorbent body 20. The non-colored region R2 is sandwiched by the colored regions R1 in the first direction D1. The colored regions R1 and the non-colored region R2 both overlap the absorbent core 30 of the absorbent body 20 in a plan view.

Some pets discharge urine unevenly only at a certain region (for example, one colored region R1) rather than discharge urine evenly throughout the entire region of the absorbent body. At this time, in a different region (for example, the other colored region R1), urine is not discharged or the amount of urine discharged becomes small During use, urine can be covered with the colored portions 80 in the colored regions R1. In addition, at the time of replacement, one colored region R1 where a large amount of urine is discharged and the other colored region R1 where a small amount of urine is discharged are visually compared with each other. At this time, the colored regions R1 are provided on both sides of the non-colored region R2, and one colored region R1 and the other colored region R1 are divided by the non-colored region R2. Comparison of the colored regions R1 on both sides across the non-colored region R2 facilitates the comparison of the colored regions R1 on both sides. Therefore, users can easily identify whether only one colored region R1 was used and thus the orientation needs to be changed or both colored regions R1 were used and thus the sheet needs to be replaced. In addition, since the non-colored region R2 where the colored portions 80 are not disposed is provided, in the non-colored region R2, the trace of urine is less likely to be covered with the colored portions 80. Therefore, users can easily identify whether or not urine was discharged on the pet absorbent sheet 10.

The non-colored region R2 may straddle a center 20LC of the absorbent body 20 in the first direction D1. The non-colored region R2 is provided at the center 20LC of the absorbent body 20 in the first direction D1. The non-colored region R2 becomes easily noticeable, and users can easily identify the non-colored region R2 and more easily identify a time for replacing the sheet.

A length L2 of the non-colored region R2 in the first direction D1 may be longer than a length L80 of the colored portion 80 in the first direction D1. Since the length of the non-colored region R2 in the first direction D1 is longer than the length of the colored portion in the first direction D1, it becomes easy to differentiate the gaps between the colored portions 80 and the non-colored region R2. Therefore, it is easier to obtain an effect of dividing the colored regions R1 on both sides with the non-colored region R2. It should be noted that, in a configuration having a plurality of the colored portions 80 with different dimensions, the length of the colored portion 80 having the longest length in the first direction D1 is regarded as the length of the colored portion 80 in the first direction D1. The length L2 of the non-colored region R2 in the first direction D1 may be longer than a length L1 of each colored region R1 in the first direction D1. Since the length L2 of the non-colored region R2 in the first direction D1 is longer than the lengths L1 of the colored regions R1 in the first direction D1, it is easier to obtain an effect of differentiating the individual colored regions R1 with the non-colored region R2.

The length L1 in the first direction of the colored region R1 disposed on one side of the center 20LC of the absorbent body 20 in the first direction D1 and the length L1 in the first direction D1 of the colored region R1 disposed on the other side of the center 20LC may be different from each other. It becomes easy to differentiate the individual colored regions R1 and to compare the colored regions R1 on both sides. Therefore, users can easily identify whether only one colored region R1 was used and thus the orientation needs to be changed or both colored regions R1 were used and thus the sheet needs to be replaced.

In the region that overlaps the absorbent body 20, second non-colored regions R3 where the colored portions 80 are not disposed throughout the entire region of the absorbent body 20 in the second direction D2 may be provided on the outer sides of the colored regions R1 in the first direction D1. On both sides across the colored region R1, the non-colored region R2 and the second non-colored region R3 are provided. The colored portions 80 in the colored regions R1 become more easily noticeable, and the comparison between the colored regions R1 on both sides becomes easier.

The length L3 of the second non-colored region R3 in the first direction D1 may be shorter than the length L1 of the colored region R1 in the first direction D1. It is possible to make the colored regions R1 noticeable, and it becomes easy for users to compare the colored regions R1 on both sides. Therefore, users can easily identify whether only one colored region R1 was used and thus the orientation needs to be changed or both colored regions R1 were used and thus the sheet needs to be replaced.

The colored portions 80 may include a first colored portion 80A colored with a first color and a second colored portion 80B colored with a second color that is different from the first color. For example, the pet pattern has a first pet pattern 81A colored with the first color and a second pet pattern 81B colored with the second color. In addition, the auxiliary pattern 84 has a first auxiliary pattern 84A colored with the first color and a second auxiliary pattern 84B colored with the second color. The first colored portion 80A has the first pet pattern 81A and the first auxiliary pattern 84A. The second colored portion 80B has the second pet pattern 81B and the second auxiliary pattern 84B. That is, the first pet pattern 81A and the first auxiliary pattern 84A are colored with the same color. In addition, the second pet pattern 81B and the second auxiliary pattern 84B are colored with the same color. It should be noted that the first pet pattern 81A and the first auxiliary pattern 84A need to be mainly colored with the first color and may be partially colored with a color other than the first color. Similarly, the second pet pattern 81B and the second auxiliary pattern 84B need to be mainly colored with the second color and may be partially colored with a color other than the second color. The state where the patterns are colored with the main color refers to a state where 90% or more of the patterns are colored with the main color.

The area ratio of the second colored portions 80B to the first colored portions 80A in one colored region R1 (first colored region) may be different from the area ratio of the second colored portions 80B to the first colored portions 80A in the other colored region R1 (second colored region). Specifically, the colored portions including the first pet patterns 81A and the first auxiliary patterns 84A are regarded as the first colored portions 80A, and the colored portions including the second pet pattern 81B and the second auxiliary pattern 84B are regarded as the second colored portions 80B, and the area ratios may be compared with each other. Since the area ratio of the second colored portions 80B to the first colored portions 80A differs in one colored region R1 and the other colored region R1, users can differentiate one colored region and the other colored region with the difference in the configuration ratio of color, and the comparison between the colored regions on both sides becomes easy.

Preferably, the area of the first colored portions 80A in one colored region R1 may be different from the area of the first colored portions in the other colored region R1. The total area of the first pet patterns 81A in one colored region R1 may be different from the total area of the first pet patterns 81A in the other colored region R1, and the total area of the second pet patterns 81B in one colored region R1 may be different from the total area of the second pet patterns 81B in the other colored region R1. Similarly, the total area of the first auxiliary patterns 84A in one colored region R1 may be different from the total area of the first auxiliary patterns 84A in the other colored region R1, and the total area of the second auxiliary patterns 84B in one colored region R1 may be different from the total area of the second auxiliary patterns 84B in the other colored region R1. With such a configuration, since the patterns differ in one colored region and the other colored region, users can differentiate one colored region and the other colored region with the difference in pattern, and the comparison between the colored regions on both sides becomes easy.

The number of the first colored portions 80A in one colored region R1 may be different from the number of the first colored portions 80A in the other colored region R1. In addition, the number of the second colored portions 80B in one colored region R1 may be different from the number of the second colored portions 80B in the other colored region R1. Preferably, the number of the first pet patterns 81A in one colored region R1 may be different from the number of the first pet patterns 81A in the other colored region R1, and the number of the second pet patterns 81B in one colored region R1 may be different from the number of the second pet patterns 81B in the other colored region R1 Similarly, the number of the first auxiliary patterns 84A in one colored region R1 may be different from the number of the first auxiliary patterns 84A in the other colored region R1, and the number of the second auxiliary patterns 84B in one colored region R1 may be different from the number of the second auxiliary patterns 84B in the other colored region R1. With such a configuration, since the patterns differ in one colored region and the other colored region, users can differentiate one colored region and the other colored region with the difference in pattern, and the comparison between the colored regions on both sides becomes easy.

A colored portion in one colored region R1 and a colored portion in the other colored region R1 disposed on an any straight line FL that passes through one colored portion and extends along the first direction may differ in terms of at least one of color or shape. When comparing one colored region R1 and the other colored region R1, users alternately see one colored region R1 and the other colored region R1 by moving their eyes in the first direction D1. At this time, since the colored portions adjacent to each other in the first direction are different, users can differentiate one of the colored regions and the other colored region with the difference in color or shape of the colored portions, and the comparison between the colored regions on both sides becomes easy.

Specifically, as shown in FIG. 1, a second pet pattern 81B in one colored region R1 (the colored region R1 positioned on the lower side in FIG. 1) and a second pet pattern 81B in the other colored region R1 (the colored region R1 positioned on the upper side in FIG. 1) are disposed on the any straight line FL1 that extends along the first direction. These patterns are identical in color, but different in shape (the pattern on one side is a cat in a sitting state, and the pattern on the other side is a cat in a lying state). In addition, a first pet pattern 81A in one colored region R1 and a second pet pattern 81B in the other colored region R1 are disposed on an any straight line FL2 that extends along the first direction. These patterns are different in color and also different in shape.

The first color and the second color need to be different colors and are not particularly limited. The degree of difference between the first color and the second color needs to be by two or more hues in the 24 color hues classified by the Ostwald hue circle. In addition, for example, the first color may be a color with a green hue, and the second color may be a color with a purple hue. That is, the first pet patterns 81A and the first auxiliary patterns 84A configuring the first colored portions 80A may be colored with the first color with a green hue, and the second pet patterns 81B and the second auxiliary patterns 84B configuring the second colored portions 80B may be colored with the second color with a purple hue. Usually, the color of urine discharged from pets in a healthy state exhibits a yellow hue, and the color of urine discharged from pets in an unhealthy state exhibits a red hue. Both the first colored portions 80A with a green hue and the second colored portions 80B with a purple hue are easily recognized distinctively with respect to yellow hues and red hues. Therefore, users easily recognize the colored portions 80 and urine distinctively, and it is possible to suppress users mistakenly recognizing the colored portions 80 as the trace of urine. Therefore, users are less likely to mistakenly recognize unused pet absorbent sheets as used pet absorbent sheets.

In addition, users easily recognize urine and the colored portions 80 distinctively and thus can pay attention to the colored portions 80. It is possible to enhance the designability of the pet absorbent sheet with the colored portions 80. In addition, the colored portions 80 are made noticeable, whereby urine is made relatively unnoticeable, and the trace of urine is camouflaged, which can enhance the urine-covering performance.

Here, the color of urine in a healthy state has a color having an R value of 236 to 255, a G value of 208 to 241, and a B value of 29 to 86 that are based on the RGB color system. In addition, the color of urine in an unhealthy state has a color having an R value of 213 to 223, a G value of 84 to 89, and a B value of 53 to 69 that are based on the RGB color system. The first colored portion 80A may be a color having an R value of 0 to 128, a G value of 165 to 191, and a B value of 90 to 113 that are based on the RGB color system. All of the R value, the G value, and the B value of the first colored portion are not identical to the values of the color of urine in a healthy state and the color of urine in an unhealthy state, and the first colored portion is easily differentiated from urine. The second colored portion 80B may be a color having an R value of 127 to 186, a G value of 65 to 91, and a B value of 136 to 151 that are based on the RGB color system. Both the R value and the B value of the second colored portion are not identical to the values of the color of urine in a healthy state and the color of urine in an unhealthy state, and the second colored portion is easily differentiated from urine.

These RGB values can be measured using a commercially available colorimeter. The color of the colored portion in one or more embodiments refers not to its own color of the colored sheet, but to a color visible through the top-surface sheet, and the color is measured from the top-surface side of the pet absorbent sheet at the time of measuring the RGB values. The color difference with respect to a white standard plate was measured using the first color, the second color, the color of urine in a healthy state, and the color of urine in an unhealthy state that fall within the ranges of the RGB values. The color difference refers to ΔL, Δa, and Δb of the (L*a*b*) color space with respect to the white standard plate. The measurement results are shown in Table 1. The color difference with respect to the white standard plate can be calculated by measuring the lab value of the white standard plate and the lab value of a target sample, respectively. The lab value of the white standard plate is set to zero at (X93.19, Y95.20, Z112.28). As the color difference measuring instrument, it is possible to use, for example, CR-300 manufactured by Konica Minolta, Inc., and, as the light source of the measuring machine, it is possible to use a C light source (the standard of the International Commission on Illumination (CIE)). The diameter of the measuring window of the measuring machine is 40 mm. Here, L is a value that marks brightness, and a and b are the plane coordinates of chromaticity. When the Lab value of the white standard plate is expressed as L0, a0, and b0, and the Lab value of the target sample is expressed as L1, a1, and b1, the color difference can be calculated from ΔL=L0−L1, Δa=a0−a1, and Δb=b0−b1.

patterns 81B. Therefore, even when there is a plurality of kinds of pets, pets that are the targets are easily identified. Even in a case where the color of urine in a healthy state or the color of urine in an unhealthy state differs for each of the pets that are the targets, it is easy to appropriately identify the health state of each pet by identifying the pet that becomes the target.

Additionally, since the pet pattern 81 and the auxiliary pattern 84 are integrally provided, the designability is enhanced, and it is possible to further enhance the urine-covering effect. Preferably, a distance L13 between a first conglomerate that is the combination of the first pet pattern 81A and the second auxiliary pattern 84B and a second conglomerate that is the combination of the second pet pattern 81B and the first auxiliary pattern 84A may be made longer than a distance L11 between the first pet pattern 81A and the second auxiliary pattern 84B and made longer than a distance L12 between the second pet pattern 81B and the first auxiliary pattern 84A. It becomes easy to recognize the first conglomerate that is the combination of the first pet pattern 81A and the second auxiliary pattern 84B and the second conglomerate that is the combination of the second pet pattern 81B and the first auxiliary pattern 84A, and it is possible to integrate the pet pattern 81 and the auxiliary pattern 84.

TABLE 1

|    | First color | | | Second color | | | Urine in healthy state | | | Urine in unhealthy state | | |
|----|------|------|------|------|------|------|------|------|------|------|------|------|
|    | Avg. | Max. | Min. | Avg. | Max. | Min. | Avg. | Max. | Min. | Avg. | Max. | Min. |
| ΔL | 81.39 | 82.47 | 79.89 | 71.47 | 74.02 | 70.11 | 89.91 | 90.61 | 89.13 | 87.81 | 88.46 | 86.89 |
| Δa | −26.48 | −24.61 | −28.37 | 11.89 | 12.25 | 10.92 | 2.17 | 2.79 | 1.63 | 5.62 | 6.38 | 5.01 |
| Δb | 13.73 | 16.5 | 12.42 | −8.62 | −7.85 | −9.03 | 10.41 | 10.99 | 9.57 | 7.75 | 8.48 | 7.16 |

The colored portions 80 are disposed along the contours of designs, and non-colored portions 85 may be provided in regions surrounded by the colored portions 80. Specifically, the pet patterns 81 are disposed along the contours of cats, and the auxiliary patterns 84 are disposed along the contours of butterflies. In the regions surrounded by the colored portions 80 that configure the contours, the non-colored portions 85 are provided. In a case where urine is discharged on the non-colored portion 85, it is possible to compare urine and the colored portions 80. In addition, since the colored portions 80 are disposed to surround the non-colored portions 85, it is possible to identify the spread condition of urine with the colored portions 80. Therefore, it is also possible to identify the health states of pets by identifying the amount of urine.

As shown in FIG. 3, in a region that overlaps the first pet pattern 81A or the vicinity thereof, the second auxiliary pattern 84B may be disposed, and, in a region that overlaps the second pet pattern 81B or the vicinity thereof, the first auxiliary pattern 84A may be disposed. Here, the state where the pattern is disposed in the vicinity refers to a state where the distance between the two patterns is 10 mm or shorter. Since the first pet pattern 81A and the second auxiliary pattern 84B are disposed close to each other, and the second pet pattern 81B and the first auxiliary pattern 84A are disposed close to each other, it is possible to compare both the first colored portion 80A and the second colored portion 80B with urine. Therefore, a healthy state and an unhealthy state are easily identified.

In addition, users can identify the pet that is the target user by seeing the first pet patterns 81A and the second pet The maximum dimension of the first pet pattern 81A may be made larger than the maximum dimension of the second auxiliary pattern 84B, and the maximum dimension of the second pet pattern 81B may be made larger than the maximum dimension of the first auxiliary pattern 84A. The first pet pattern 81A and the second pet pattern 81B are easily noticeable, and users can identify the pet that is the target user. Therefore, even when there is a plurality of kinds of pets, it is easy to identify the pets that are the targets and to identify the health states of the pets that become the targets.

An outer peripheral colored portion 87 has the first color or the second color. Since the outer peripheral colored portion 87 has the first color or the second color, it is possible to make the first colored portions 80A or the second colored portions 80B noticeable with the outer peripheral colored portion 87. Therefore, it is possible to further enhance the urine-covering effect of the colored portions 80.

Figure 4:
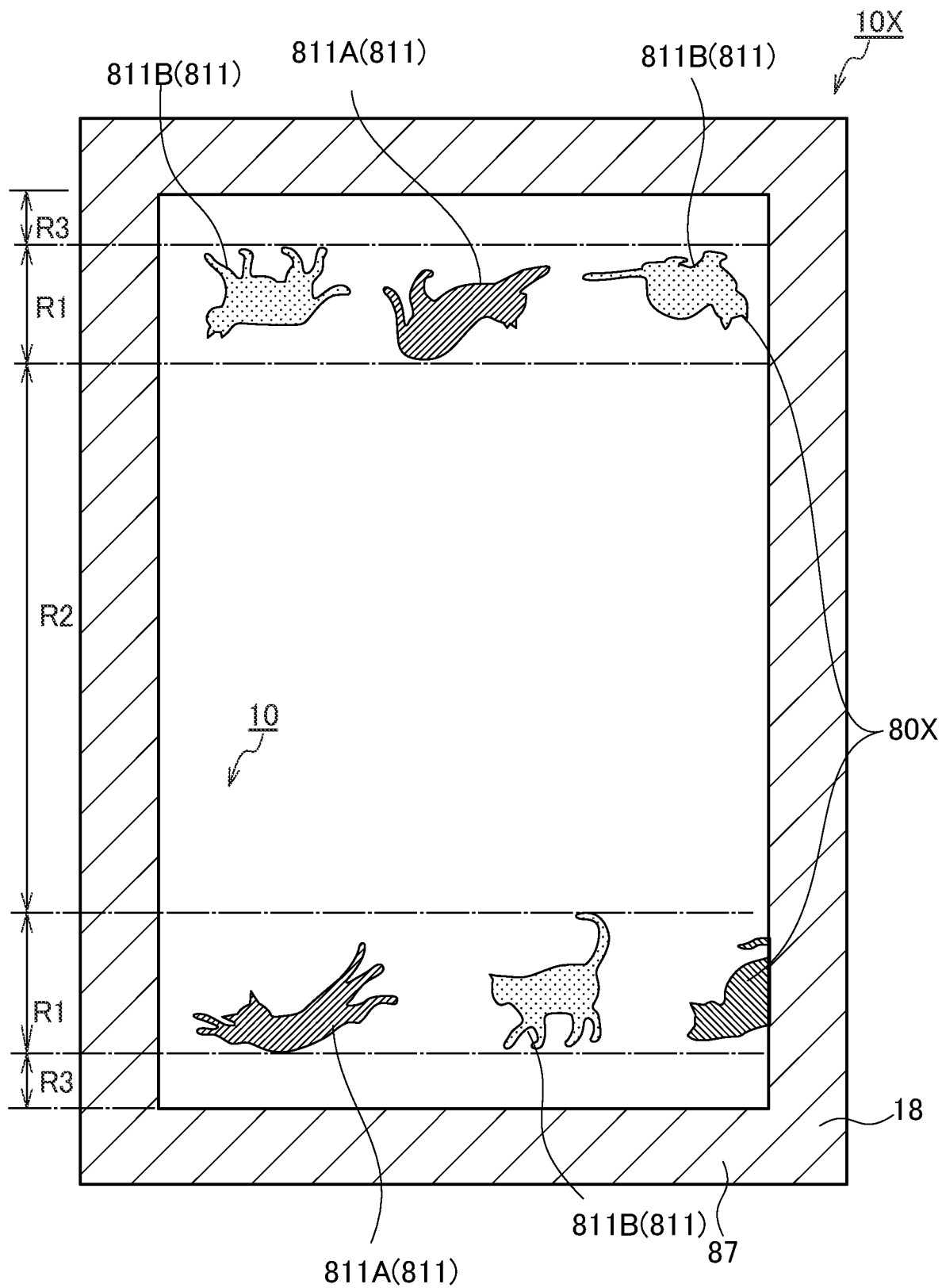
FIG. 4 is a plan view of a pet absorbent sheet according to a second embodiment as seen from an excretion surface side.

Next, a pet absorbent sheet 10X according to a second embodiment will be described based on FIG. 4. FIG. 4 is a plan view of the pet absorbent sheet according to the second embodiment as seen from an excretion surface side. It should be noted that, in the description of the second embodiment, the same configuration as in the first embodiment will not be described again by giving the same reference sign.

Colored portions 80X of the second embodiment have pet patterns 811, but have no auxiliary patterns. Users can easily identify a pet that is the target user by seeing the pet patterns 811. In addition, since there are no auxiliary patterns, it is possible to make the pet patterns 811 noticeable, and it is easy to make the target user recognized.

The pet pattern 811 has a first pet pattern 811A colored with a first color and a second pet pattern 811B colored with a second color. The first pet pattern 811A and the second pet pattern 811B are patterns that are painted not only in the contour but also in the entire inside. The pet patterns are more likely to be noticeable, and it becomes easy for users to compare colored regions on both sides. Therefore, users can easily identify whether only one colored region was used and thus the orientation needs to be changed or both colored regions were used and thus the sheet needs to be replaced.

Figure 5:
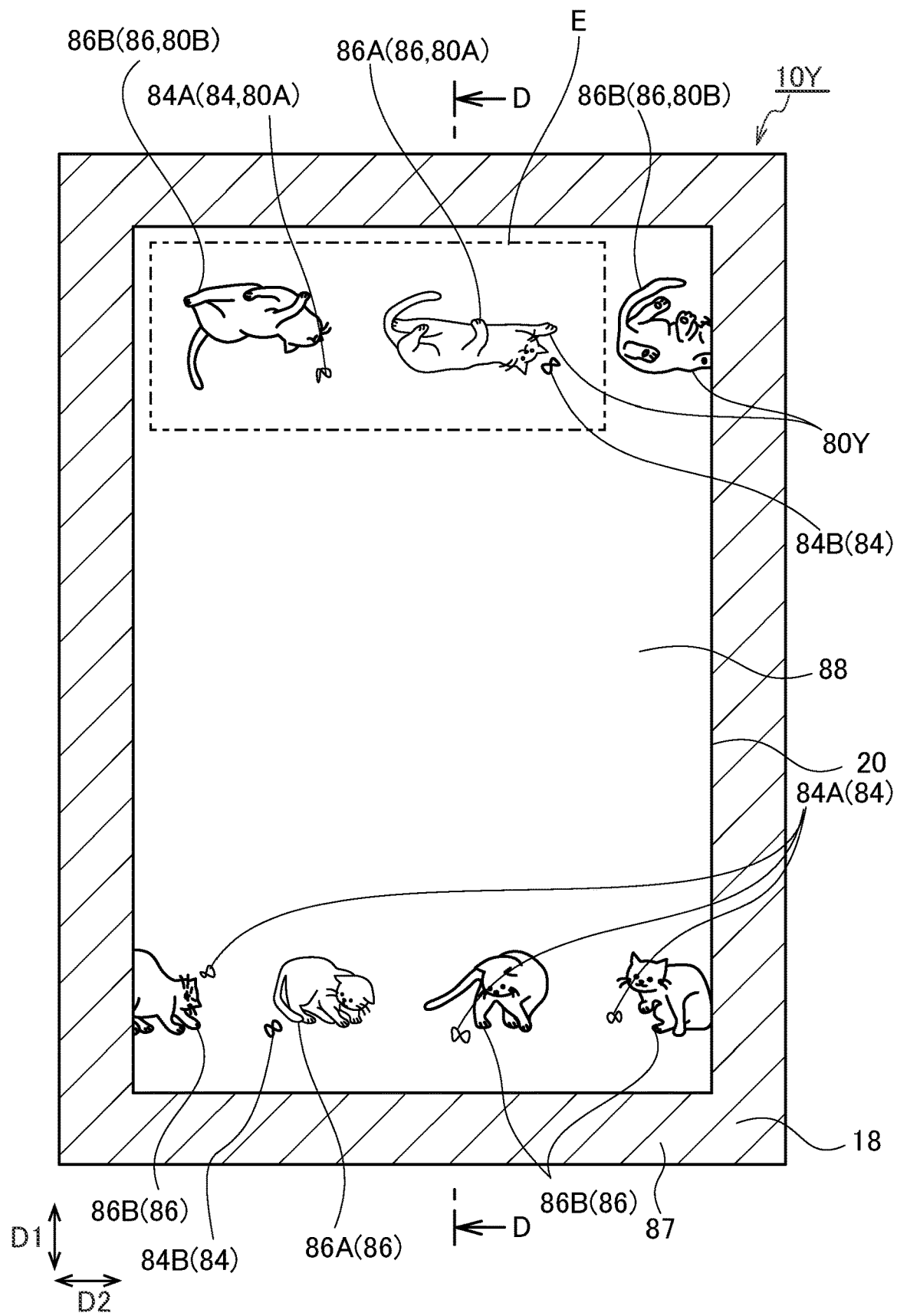
FIG. 5 is a plan view of a pet absorbent sheet according to a third embodiment as seen from an excretion surface side.
Figure 6:
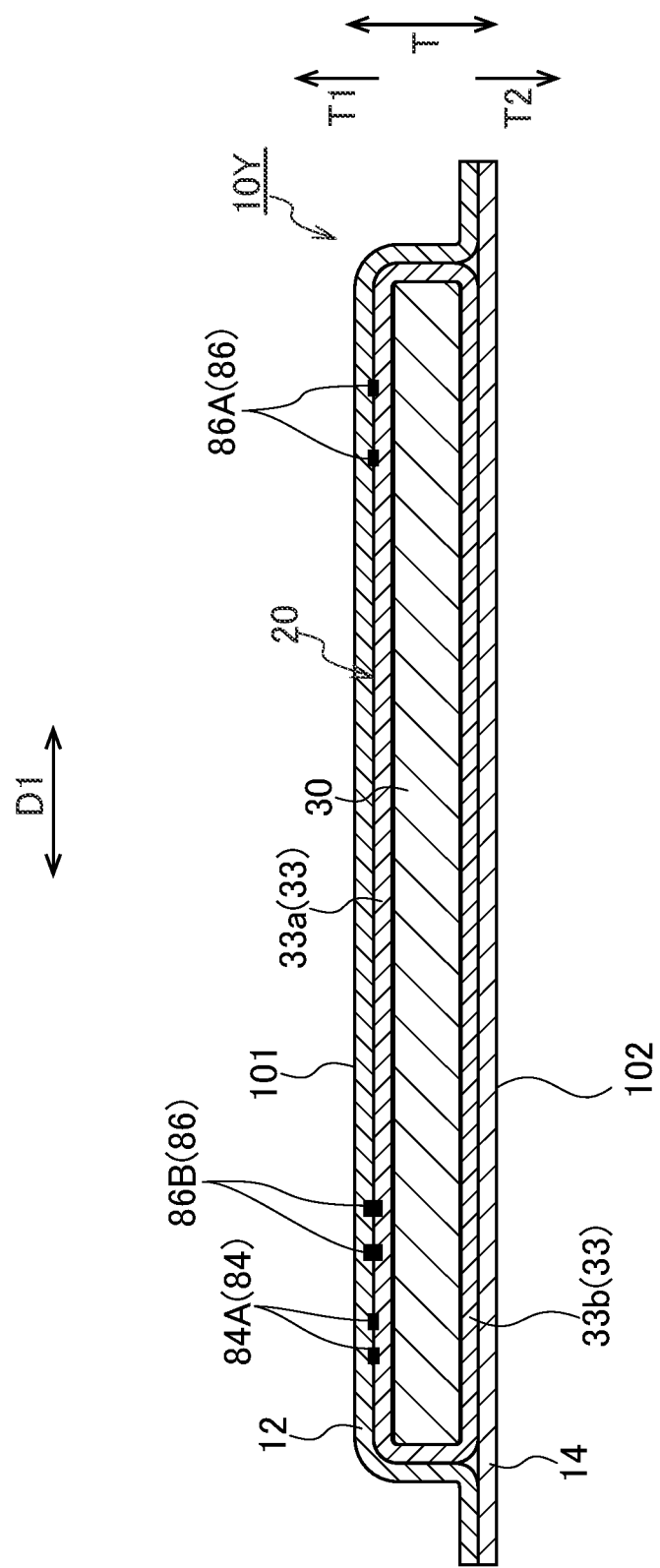
FIG. 6 is a schematic cross-sectional view of the pet absorbent sheet taken along a line D-D shown in FIG. 5.
Figure 7:
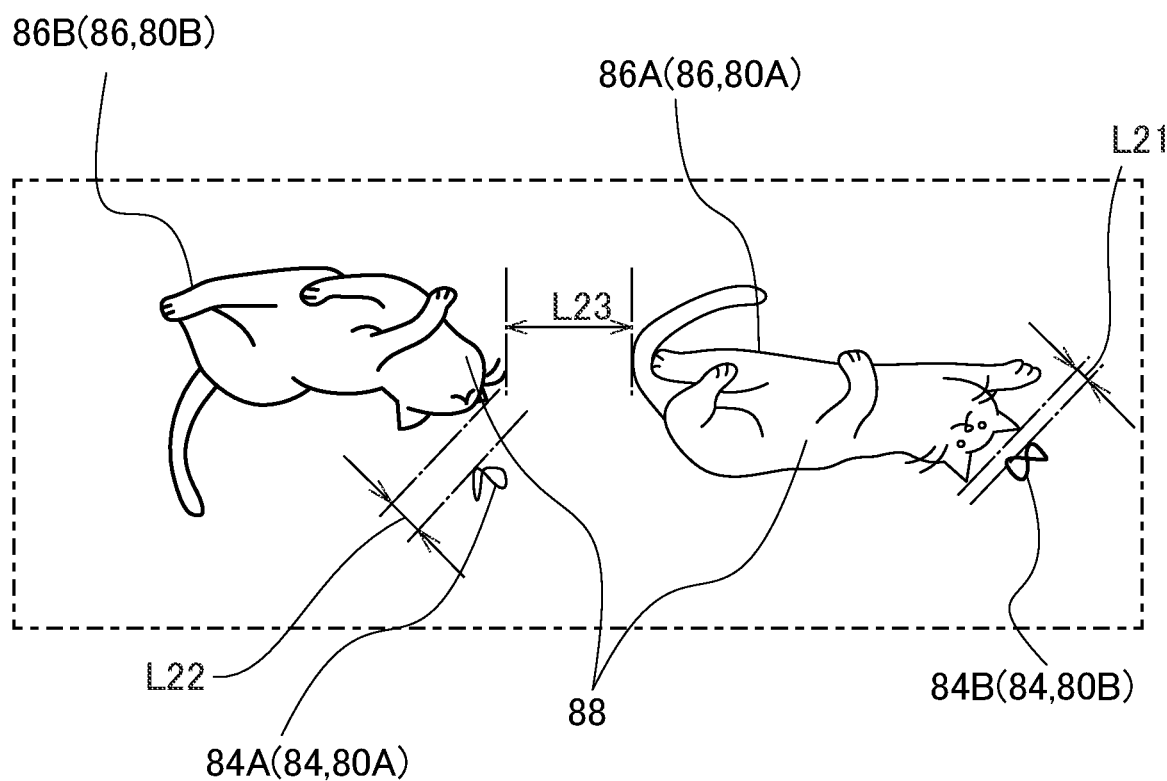
FIG. 7 is an enlarged plan view of part E in FIG. 5.

Next, a pet absorbent sheet 10Y according to a third embodiment will be described based on FIG. 5 to FIG. 7. It should be noted that, in the following description of the third embodiment, the same configuration as in the above-described embodiment and the second embodiment will not be described again by giving the same reference sign. FIG. 5 is a plan view of the pet absorbent sheet according to the third embodiment as seen from an excretion surface side. FIG. 6 is a schematic cross-sectional view of the pet absorbent sheet taken along a line D-D shown in FIG. 1. FIG. 7 is an enlarged plan view of part E in FIG. 5. Colored portions 80Y of the pet absorbent sheet 10Y may have pet face patterns 86 that indicate the face of a pet that is the target user and auxiliary patterns 84 that indicate a thing other than pets. The pet face pattern 86 needs to include at least a figure that indicates the face of the pet and may include a figure that indicates the body of the pet. Therefore, the pet face pattern 86 may be a pattern that also serves as the pet pattern 81 marking the pet that is the target user or may be a different pattern. The auxiliary pattern 84 is a figure that indicates a thing other than pets and may be an any figure such as a heart figure or a star figure.

The colored portions 80Y may have a first colored portion 80A colored with a first color and a second colored portion 80B colored with a second color that is different from the first color. For example, the pet face pattern 86 has a first pet face pattern 86A colored with the first color and a second pet face pattern 86B colored with the second color. In addition, the auxiliary pattern 84 may have a first auxiliary pattern 84A colored with the first color and a second auxiliary pattern 84B colored with the second color. The first colored portion 80A has the first pet face pattern 86A and the first auxiliary pattern 84A. The second colored portion 80B has the second pet face pattern 86B and the second auxiliary pattern 84B. That is, the first pet face pattern 86A and the first auxiliary pattern 84A are colored with the same color. In addition, the second pet face pattern 86B and the second auxiliary pattern 84B are colored with the same color. It should be noted that the first pet face pattern 86A and the first auxiliary pattern 84A need to be mainly colored with the first color and may be partially colored with a color other than the first color. Similarly, the second pet face pattern 86B and the second auxiliary pattern 84B need to be mainly colored with the second color and may be partially colored with a color other than the second color. The state where the patterns are colored with the main color refers to a state where 90% or more of the patterns are colored with the main color.

With the first pet face pattern 86A and the second pet face pattern 86B, the decorativeness is enhanced, and it is possible to attract users' attention. In addition, since the first pet face pattern 86A and the second pet face pattern 86B are different colors, both patterns are not integrally recognized, and it is possible to make the patterns separately noticeable. Users can easily identify the pet that is the target user by seeing the pet face patterns. In addition, the pet face patterns may indicate the face of a cat that is the target user. Users can easily identify that a cat is the target user by seeing the pet face pattern.

The colored portions 80Y may not have a non-target pattern that indicates pets other than the target pet. The pets other than the target pet are, in a cat absorbent sheet, pets such as dogs, rabbits, and hamsters that are pets other than a cat. The pattern conceptually includes not only the face of the pet, but also a figure that indicates a part of the body of the pet or a favorite item. Since there is no non-target pattern, even when there is a plurality of pets that are the target users, it is possible to use the absorbent sheet without mistakenly recognizing the target.

The pet face pattern may be a pattern that indicates the entire body of the target user including the face. The pet face pattern shows the entire body, whereby users more easily identify the target pet. Users can easily identify the pet that is the target user by seeing the pet patterns.

The number of the pet face patterns 86 may be 50% or more of the total number of the patterns. Among all of the patterns, the pet face patterns 86 are more easily noticeable, and users can easily identify the pet that is the target user by seeing the pet face patterns 86. In addition, the number of the pet face patterns 86 may be equal to or larger than the number of the auxiliary patterns 84. The pet face patterns 86 are easily noticeable compared with the auxiliary patterns 84, and users can easily identify the pet that is the target user by seeing the pet face patterns.

The maximum dimension of the pet face pattern 86 may be larger than the maximum dimension of the auxiliary pattern 84. For example, the maximum dimension in the first direction D1 may be larger than the maximum dimension of the auxiliary pattern 84 in the first direction D1. In addition, the maximum dimension of the pet face pattern 86 in the second direction D2 may be larger than the maximum dimension of the auxiliary pattern 84 in the second direction D2. The pet face patterns 86 are easily noticeable compared with the auxiliary patterns 84, and users can easily identify the pet that is the target user by seeing the pet face patterns 86. Due to the pet face patterns 86, users easily recognize the cat that is the target user, and, even in a case where the target user is a plurality of pets, it is possible to suppress a failure of mistakenly recognizing the target user.

The first color and the second color need to be different colors and are not particularly limited. The degree of difference between the first color and the second color needs to be by two or more hues in the 24 color hues classified by the Ostwald hue circle. In addition, for example, the first color may be a color with a green hue, and the second color may be a color with a purple hue. That is, the first pet face patterns 86A and the first auxiliary patterns 84A configuring the first colored portions 80A may be colored with the first color with a green hue, and the second pet face patterns 86B and the second auxiliary patterns 84B configuring the second colored portions 80B may be colored with the second color with a purple hue. Usually, the color of urine discharged from pets in a healthy state exhibits a yellow hue, and the color of urine discharged from pets in an unhealthy state exhibits a red hue. Both the first colored portions 80A with a green hue and the second colored portions 80B with a purple hue are easily recognized distinctively with respect to yellow hues and red hues. Therefore, users easily recognize the colored portions 80Y and urine distinctively, and it is possible to suppress users mistakenly recognizing the colored portions 80Y as the trace of urine. Therefore, users are less likely to mistakenly recognize unused pet absorbent sheets as used pet absorbent sheets.

In addition, users easily recognize urine and the colored portions 80Y distinctively and thus can pay attention to the colored portions 80Y. It is possible to enhance the designability of the pet absorbent sheet with the colored portions 80Y. In addition, the colored portions 80Y are made noticeable, whereby urine is made relatively unnoticeable, and the trace of urine is camouflaged, which can enhance the urine-covering performance.

The pet absorbent sheet 10Y may include a background portion 88 that is provided in a periphery of the colored portions in the region that overlaps the absorbent body and is visible from the top-surface side of the top-surface sheet. The background portion 88 is a portion not provided with the colored portions 80Y. The background portion according to one or more embodiments is formed of the top surface of the absorbent body and is white. The color of the pet face pattern needs to be different from the color of the background portion. The degree of difference in color is by two or more hues in the 24 color hues classified by the Ostwald hue circle. The color of the background portion is different from both the first color and the second color of the pet face patterns. The pet face patterns become noticeable compared with the background portion, and users more easily recognize the pet patterns. Users can easily identify the pet that is the target user by seeing the pet face patterns.

The colored portions 80Y are disposed along the contours of designs, and the background portion 88 may be provided in a region surrounded by the colored portions 80Y. Specifically, the pet face patterns 86 are disposed along the contours of cats, and the auxiliary patterns 84 are disposed along the contours of butterflies. In the region surrounded by the colored portions 80Y that configure the contours, the background portion 88 is provided. In a case where urine is discharged on the background portion 88, it is possible to compare urine and the colored portions 80Y. In addition, since the colored portions 80Y are disposed to surround the background portion 88, it is possible to identify the spread condition of urine with the colored portions 80Y. Therefore, it is also possible to identify the health states of pets by identifying the amount of urine.

As shown in FIG. 7, in a region that overlaps the first pet face pattern 86A or the vicinity thereof, the second auxiliary pattern 84B may be disposed, and, in a region that overlaps the second pet face pattern 86B or the vicinity thereof, the first auxiliary pattern 84A may be disposed. Here, the state where the pattern is disposed in the vicinity refers to a state where the distance between the two patterns is 10 mm or shorter. Since the first pet face pattern 86A and the second auxiliary pattern 84B are disposed close to each other, and the second pet face pattern 86B and the first auxiliary pattern 84A are disposed close to each other, it is possible to compare both the first colored portion 80A and the second colored portion 80B with urine. Therefore, a healthy state and an unhealthy state are easily identified. In addition, users can identify the pet that is the target user by seeing the first pet face patterns 86A and the second pet face patterns 86B. Therefore, even in a case where the there are a plurality of kinds of pets, pets that are the targets are easily identified.

Additionally, since the pet face pattern 86 and the auxiliary pattern 84 are integrally provided, the designability is enhanced, and it is possible to further enhance the urine-covering effect. Preferably, a distance L23 between a first conglomerate that is the combination of the first pet face pattern 86A and the second auxiliary pattern 84B and a second conglomerate that is the combination of the second pet face pattern 86B and the first auxiliary pattern 84A may be made longer than a distance L21 between the first pet face pattern 86A and the second auxiliary pattern 84B and made longer than a distance L22 between the second pet face pattern 86B and the first auxiliary pattern 84A. It becomes easy to recognize the first conglomerate that is the combination of the first pet face pattern 86A and the second auxiliary pattern 84B and the second conglomerate that is the combination of the second pet face pattern 86B and the first auxiliary pattern 84A, and it is possible to integrate the pet face pattern 86 and the auxiliary pattern 84.

The color of the auxiliary pattern 84 is different from the color of the pet face pattern 86 disposed at the position closest to the auxiliary pattern 84, and the degree of difference in color needs to be by two or more hues in the 24 color hues classified by the Ostwald hue circle. In FIG. 7, the pet face pattern 86 disposed at the position closest to the second auxiliary pattern 84B is the first pet face pattern 86A, and the pet face pattern 86 disposed at the position closest to the first auxiliary pattern 84A is the second pet face pattern 86B. Users easily recognize the pet patterns and the auxiliary patterns distinctively. Users can easily identify the pet that is the target user by seeing the pet face patterns.

The maximum dimension of the first pet face pattern 86A may be made larger than the maximum dimension of the second auxiliary pattern 84B, and the maximum dimension of the second pet face pattern 86B may be made larger than the maximum dimension of the first auxiliary pattern 84A. The first pet face pattern 86A and the second pet face pattern 86B are easily noticeable, and users can identify the pet that is the target user.

The outer peripheral colored portion 87 may have a color similar to the first color. The degree of similarity in color is in an identical color hue or in a range of difference of only one hue number in the 24 color hues classified by the Ostwald hue circle. The outer peripheral colored portion and the first color pattern are integrated with each other, whereby decorativeness is enhanced, and it is possible to attract users' attention. In addition, the outer peripheral colored portion and the first color pattern are integrated with each other, whereby the second color pattern is likely to become relatively noticeable. Users can easily identify the pet that is the target user by recognizing the first color pattern or the second color pattern.

Figure 8:
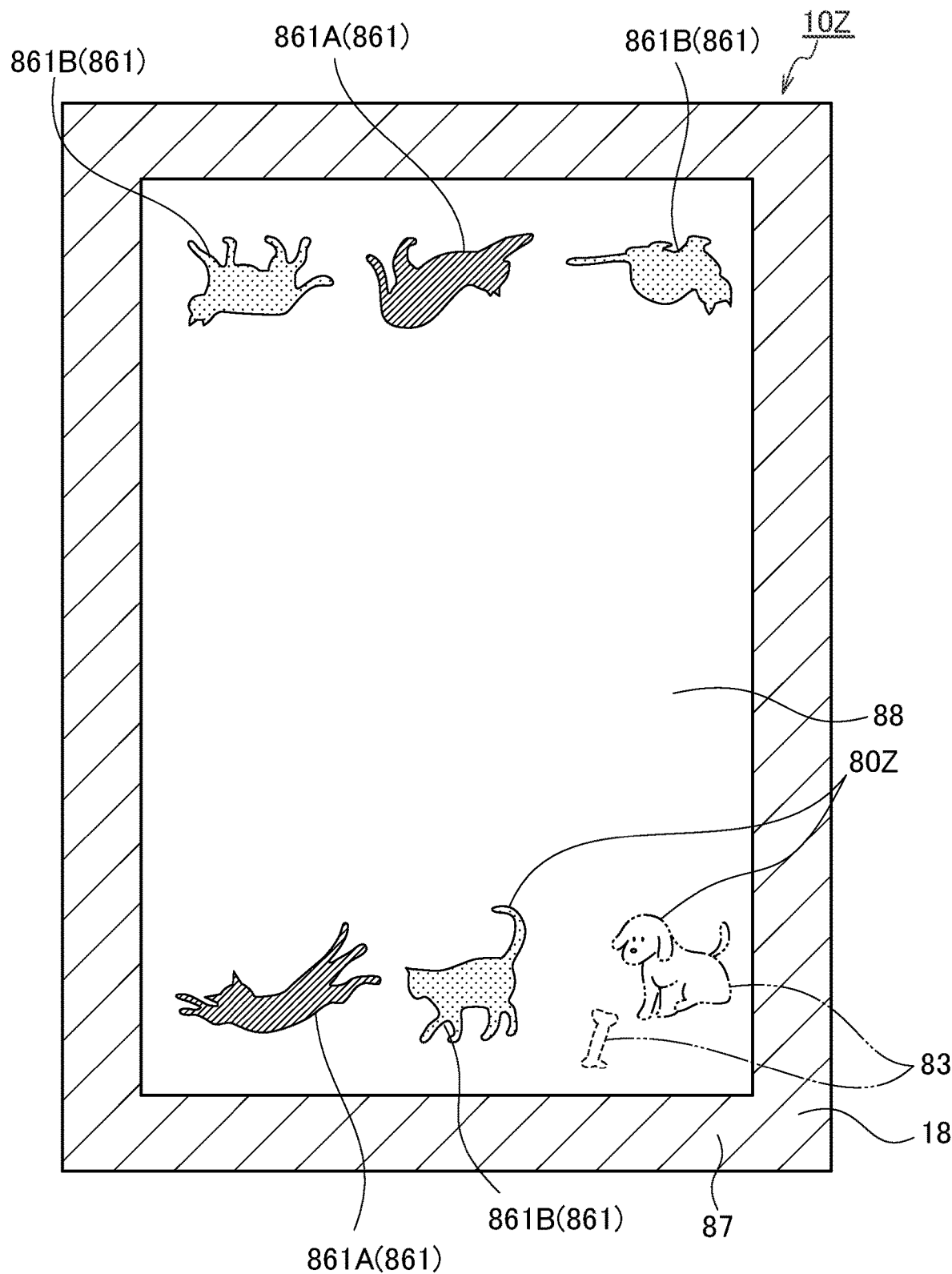
FIG. 8 is a plan view of a pet absorbent sheet according to a fourth embodiment as seen from an excretion surface side.

Next, a pet absorbent sheet 10Z according to a fourth embodiment will be described based on FIG. 8. FIG. 8 is a plan view of the pet absorbent sheet according to the fourth embodiment as seen from an excretion surface side. It should be noted that, in the description of the fourth embodiment, the same configuration as in the above-described embodiments will not be described again by giving the same reference sign.

Colored portions 80Z of the fourth embodiment have pet face patterns 861 and non-target patterns 83 and have no auxiliary patterns. The non-target patterns 83 are figures that indicate a dog that is a pet other than the target user. Specifically, the non-target patterns include a figure that indicates a whole dog and a figure that indicates a born that dogs like. The number of the pet face patterns 86 may be twice or more the number of the non-target patterns 83. Users can easily identify the pet that is the target user by seeing the pet face pattern. Since the number of the pet face patterns is twice or more the number of the non-target patterns, users easily recognize that the pet face pattern indicates the target, and it is possible to suppress a failure of mistakenly recognizing the target user. Even when there is a plurality of pets that are the target users, it is possible to use the absorbent sheet without mistakenly recognizing the target.

The maximum dimension of the pet face pattern 86 may be larger than the maximum dimension of the non-target pattern 83. The pet face patterns 86 are more easily noticeable than the non-target patterns 83, and users can easily identify the pet that is the target user by seeing the pet face patterns 86.

The color of the non-target pattern 83 is different from the color of the pet face pattern 86 disposed at the position closest to the non-target pattern 83, and the degree of difference in color needs to be by two or more hues in the 24 color hues classified by the Ostwald hue circle. Users easily recognize the pet face patterns 86 and the non-target patterns 83 distinctively. Users can easily identify the pet that is the target user by seeing the pet face patterns 86.

The pet face pattern 861 has a first pet face pattern 861A colored with a first color and a second pet face pattern 861B colored with a second color. The first pet face pattern 861A and the second pet face pattern 861B are patterns that are painted not only in the contour but also in the entire inside. The pet face patterns become more noticeable.

According to one or more embodiments, the pet absorbent sheet enables users to easily differentiate a urine-absorbed region and a non-urine-absorbed region and to easily identify a time for replacing the sheet.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10, 10X, 10Y, 10Z: Pet absorbent sheet, 12: top-surface sheet, 14: back-surface sheet, 20: absorbent body, 30: absorbent core, 33: core wrap, 80, 80X, 80Y, 80Z: colored portion, 80A: first colored portion, 80B: second colored portion, 81, 811: pet pattern, 81A, 811A: first pet pattern (first colored portion), 81B, 811B: second pet pattern (second colored portion), 84: auxiliary pattern, 84A: first auxiliary pattern (first colored portion), 84B: second auxiliary pattern (second colored portion), 86, 861: pet face pattern, 86A, 861A: first face pet pattern (first colored portion), 86B, 861B: second face pet pattern (second colored portion), 88: background portion, R1: colored region, R2: non-colored region, R3: second non-colored region, T: thickness direction, T1: top-surface side, T2: back-surface side, D1: first direction, D2: second direction

What is claimed is:

1. A pet absorbent sheet having a thickness direction, a longitudinal direction orthogonal to the thickness direction, and a width direction orthogonal to the thickness direction and the longitudinal direction, the pet absorbent sheet comprising:
   a top-surface sheet disposed on a top-surface side;
   a back-surface sheet disposed on a back-surface side;
   an absorbent body disposed between the top-surface sheet and the back-surface sheet; and
   colored portions disposed on a back-surface side of the top-surface sheet and that are visible from a top-surface side of the top-surface sheet, wherein
   an overlapping region that overlaps the absorbent body comprises:
      at least two colored regions where the colored portions are disposed; and
      at least one non-colored region, disposed along an entire width of the absorbent body in the width direction, where none of the colored portions are disposed,
   the one non-colored region is disposed between the two colored regions in the longitudinal direction of the absorbent body,
   the one non-colored region straddles a center of the absorbent body in the longitudinal direction,
   a length of the one non-colored region in the longitudinal direction is longer than a length of any of the colored portions in the longitudinal direction,
   one of the colored portions in one of the two colored regions is different in both color and shape compared to another of the colored portions in the other of the two colored regions disposed on a straight line extending along the longitudinal direction and passing through the one of the colored portions,
   the colored portions include:
      a first colored portion colored with a first color with a green hue; and
      a second colored portion colored with a second color with a purple hue,
   the first colored portion has a color having, based on an RGB color system, an R value of 0 to 128, a G value of 165 to 191, and a B value of 90 to 113,
   the second colored portion has a color having, based on the RGB color system, an R value of 127 to 186, a G value of 65 to 91, and a B value of 136 to 151,
   the colored portions are disposed along contours of a design, and
   a non-colored portion is surrounded by the colored portions.

2. The pet absorbent sheet according to claim 1, wherein a length of the one non-colored region in the longitudinal direction is longer than a length of either of the two colored regions in the longitudinal direction.

3. The pet absorbent sheet according to claim 1, wherein,
   the overlapping region comprises another non-colored region, disposed along an entire width of the absorbent body in the width direction, where none of the colored portions are disposed, and
   the another non-colored region is disposed on an outer side of the two colored regions in the longitudinal direction.

4. The pet absorbent sheet according to claim 1, wherein
   two of the colored portions in one of the two colored regions are different in color,
   another two of the colored portions in the other of the two colored regions are different in color, and
   an area ratio of the two of the colored portions in the one of the two colored regions is different from an area ratio of the another two of the colored portions in the other of the two colored regions.

5. A pet absorbent sheet comprising:
   a top-surface sheet disposed on a top-surface side;
   a back-surface sheet disposed on a back-surface side;
   an absorbent body disposed between the top-surface sheet and the back-surface sheet; and
   colored portions that are visible from a top-surface side of the top-surface sheet in an overlapping region that overlaps the absorbent body, wherein
   the colored portions include:
      a first colored portion colored with a first color with a green hue; and
      a second colored portion colored with a second color with a purple hue, the colored portions have pet patterns indicating a target pet and auxiliary patterns indicating an object other than the target pet and having a maximum dimension smaller than a maximum dimension of any of the pet patterns, the first colored portion has a first pet pattern among the pet patterns and a first auxiliary pattern among the auxiliary patterns, the second colored portion has a second pet pattern among the pet patterns and a second auxiliary pattern among the auxiliary patterns, the second auxiliary pattern is disposed in an overlapping region that overlaps the first pet pattern or a vicinity of the first pet pattern, the first auxiliary pattern is disposed in an overlapping region that overlaps the second pet pattern or a vicinity of the second pet pattern, a distance between a combination of the first pet pattern and the second auxiliary pattern and a combination of the second pet pattern and the first auxiliary pattern is longer than a distance between the first pet pattern and the second auxiliary pattern and longer than a distance between the second pet pattern and the first auxiliary pattern, at least two colored regions where the colored portions are disposed in the overlapping region that overlaps the absorbent body, and at least one non-colored region where none of the colored portions are disposed between the two colored regions in a first direction orthogonal to a thickness direction of the pet absorbent sheet are disposed, the one non-colored region is disposed along an entire width of the absorbent body in a second direction orthogonal to the first direction and the thickness direction, the first colored portion has a color having, based on an RGB color system, an R value of 0 to 128, a G value of 165 to 191, and a B value of 90 to 113, the second colored portion has a color having, based on the RGB color system, an R value of 127 to 186, a G value of 65 to 91, and a B value of 136 to 151, the colored portions are disposed along contours of a design, and a non-colored portion is surrounded by the colored portions.

6. The pet absorbent sheet according to claim 5, further comprising an outer peripheral colored portion that is visible from the top-surface side of the top-surface sheet in a periphery of the absorbent body and that has the first color or the second color.

7. The pet absorbent sheet according to claim 1, wherein the one non-colored region is disposed along an entire width of the absorbent body in the width direction at the center of the absorbent body.

8. The pet absorbent sheet according to claim 1, wherein the top-surface sheet is a liquid-permeable sheet, the back-surface sheet is a liquid-impermeable sheet, and the two colored regions and the one non-colored region are disposed between the top-surface sheet and the absorbent body.

9. The pet absorbent sheet according to claim 5, wherein the pet patterns represent the target pet that is a target user of the pet absorbent sheet.

10. The pet absorbent sheet according to claim 5, wherein the top-surface sheet is a liquid-permeable sheet, the back-surface sheet is a liquid-impermeable sheet, and the two colored regions and the one non-colored region are disposed between the top-surface sheet and the absorbent body.

* * * * *